Aug. 1, 1961

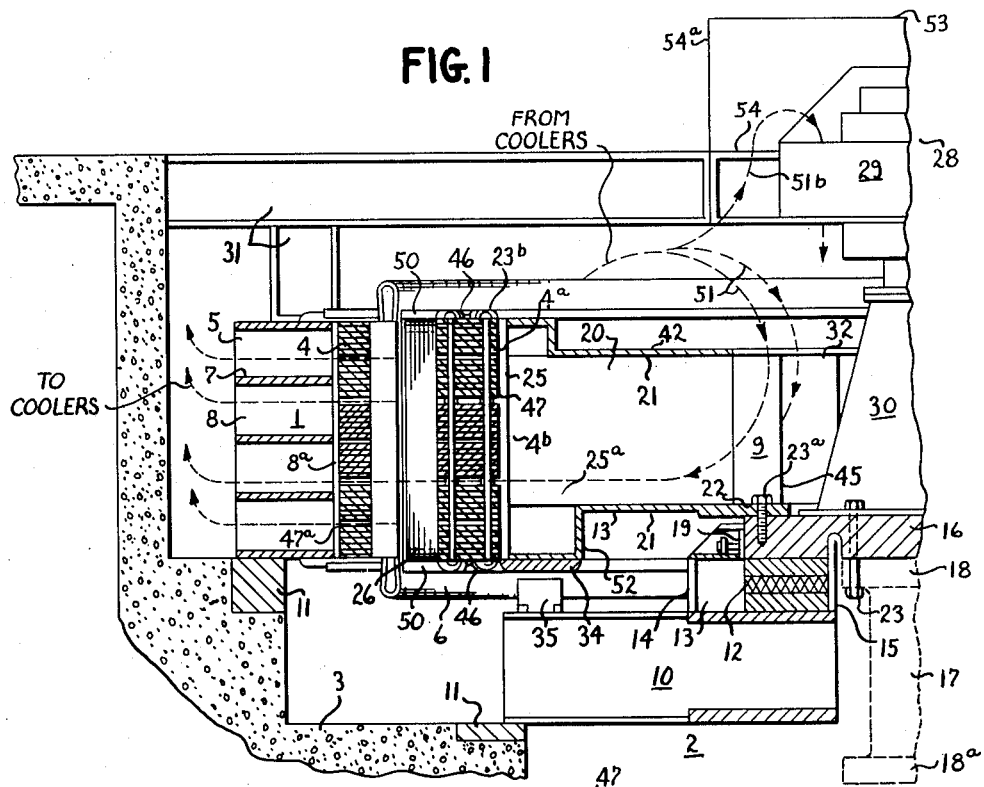

H. R. SILLS 2,994,793

DYNAMOELECTRIC MACHINE

Filed Feb. 5, 1959

INVENTOR.
HUBERT R. SILLS

BY James R Campbell

ATTORNEY 2,994,793
DYNAMOELECTRIC MACHINE
Hubert R. Sills, Peterborough, Ontario, Canada, assignor to Canadian General Electric Company, Limited, Toronto, Ontario, Canada, a company of Canada
Filed Feb. 5, 1959, Ser. No. 791,401
Claims priority, application Canada Apr. 29, 1958
20 Claims. (Cl. 310—61)

The invention described herein relates to a ventilation system for dynamoelectric machines and more particularly to an improved rotor construction for facilitating the ventilation of hydroelectric generators.

Contemporary waterwheel generators operating under moderate hydraulic heads are generally of the vertical-shaft type and are used for the continuous generation of considerable quantities of electrical power. Although continued technological improvements have increased the efficiency of such machines to approximately 98%, the amount of power generated is so large that even this small percentage loss of 2% represents such a vast amount of power that continued developmental effort is needed to realize even more efficient machines. This loss is mainly due to heating caused by hysteresis and eddy current phenomena occurring in the iron cores and to resistive losses in the copper comprising the electrical circuits in the machine.

Any heating of such machines is detrimental to the life of the electrical insulation employed on the machine windings and thus constitutes a factor in limiting the amount of power which can be generated continuously without damaging the machine. It is therefore customary to employ ventilating and cooling means whereby the rating of the machine may be increased without exceeding a temperature at which the insulation would be jeopardized.

Ventilation systems previously used include the provision of small radial-fan blades attached to the rotor rim or pole-ends to direct air against a deflecting baffle on the stator and thence axially between the field poles of the rotor. Such a deflecting baffle generally takes the form of an annular shroud extending from the stator core over the end-windings and inwardly toward the rotor rim to provide a semi-closed housing, in which a pressure head may be maintained by the radial fan arrangement. Air is continually allowed to discharge axially into the interpolar spaces and thence radially outward through suitable vents in the stator core to obtain the desired degree of cooling. Although an axial-radial ventilation system of this nature has an incidental advantage in that the shroud provides a protective mechanical shield for the end windings, it slightly limits the accessibility of parts for servicing or replacement.

In accordance with machine constructions envisioned in my Canadian Patents 418,847 and 455,303 issued March 7, 1944 and March 22, 1949 respectively, and assigned to the same assignee as the instant invention, air is directed radially through rim vents in a rotor, as well as being directed in the axial-radial manner described above, thereby effecting further improvement in cooling of the heat-generating components of the machine. Such radial ventilation is achieved by a centrifugal ventilation system employing annular baffles on either or both of the upper and lower faces of the rotor spider arms which extend inwardly along the rotor rim, thus flanking a circumferential portion of the spider radius. Relatively cool air entrapped in the ducts formed between the spider and such flanking annuli is thus impelled by centrifugal force outwardly through vents in the rim of the rotor and thence over the heated poles. To ensure that the air flow then continues radially through the stator core venting passages, without appreciable leakage axially of the pole-ends, sealing means consisting of a series of obturating fan-blades is affixed between the pole ends. Such a centrifugal ventilation system is more in harmony with the basic design of such machines than the basic type of shrouding systems discussed above, and is therefore technically more desirable, especially since far larger quantities of air are more uniformly circulated than with the foregoing shrouding system.

Conventional generator designs, however, often fail to ensure that ample central space remains available to permit access of air to the ducts, and thus seldom allow the centrifuging action caused by such annular baffles to become fully effective in providing radial ventilation. For instance, when applied to generators with through-going shafting and a pair of guide bearings, these flanking annuli can be arranged to offer adequate central access space for ventilating fluid approaching the ducts from adjacent either face of the rotor, but such ready coolant entry is often achievable only by resorting to an excessive degree of axial separation of both guide bearings and the requisite thrust bearing. This considerable axial spacing of the bearings from the rotor faces unfortunately requires lengthy shafting, besides resulting in a tall and consequently less stable machine. Alternatively, where "over-hung" designs are employed utilizing single thrust and guide bearings for reducing the overall height, the required central entry space is generally occluded by the bulk of the thrust bearing, which must be disposed adjacent one face of the rotor in order to impart dynamic stability to the machine.

Irrespective of whether the rotor employs a through-going shaft or is of the overhung type, it is customary to effect coupling of the rotor spider and drive shaft through an intermediate central hub of cylindrical or "bobbin" configuration. Such cylindrical hubs are bulky and limit the area available for entry of coolant air, and the converging spider arms also restrict accessibility to the spider-hub attachment bolts located in a hub region. Furthermore, when removal of the rotor from such an arrangement is desired, either the driveshaft must be entirely de-coupled therefrom or else the thrust bearing must be dismantled merely to allow passage therethrough of rotor-turbine coupling flanges on the driveshaft.

It therefore is apparent that contemporary dynamoelectric machine designs often permit various structural components to obtrude into the space otherwise required for efficient machine ventilation. Also, full realization of the radial ventilation capabilities of a rotating spider have not been fully developed in contemporary machines to take advantage of the rotor centrifuging tendencies.

It will be further evident that contemporary dynamoelectric machine constructors have devoted insufficient attention to the problem of rapid assembly and dismantling of such machines to enable ready installation and servicing of the rotor under field conditions.

Accordingly it is an object of my invention to provide a ventilating system wherein the structural components of the machine are employed for performing the air-impelling function required for ventilation.

It is a further object of my invention to provide a vertical dynamoelectric machine with a radial flow type ventilation system which is applicable to a wide range of ratings and permits efficient overhead or updraft type ventilation irrespective of thrust bearing location on the machine.

It is an important object of my invention to reduce the shafting requirements and the amount of masonry substructure necessary to support a vertical waterwheel generator of the overhung type, whereby the generator and its driving turbine may be closely coupled.

It is furthermore an object of my invention to provide a compact and economical vertical dynamoelectric machine construction which facilitates rotor removal without initial dismantiling of the thrust bearing and nevertheless provides adequate ventilation.

Briefly stated, my invention contemplates the use of a flat torsion disc in place of the conventional cylindrical rotor-hub, thereby in effect achieving an axially compact hub structure which renders considerable space available in the core region of the rotor for access of coolant, etc. In order to derive optimum benefits from utilization of such a flattened hub structure, I employ a lightweight rotor spider preferably built from several annuli. These annuli I fasten together in axially-separated parallel relationship by a plurality of intervening webs which effectively partition the spider into ducts and which comprise arms for support of the rotor rim. By allowing one of the annuli to project slightly into the bore region of the spider, I provide a flange by which the rotor may be conveniently coupled to the upper edge of the torsion disc. Since the torsion disc may be of relatively large diameter, the circumferential stresses are absorbed solely by this single flange. Furthermore, the torsion disc may have its lower edge seated in a thrust bearing and its peripheral surface journalled in a guide bearing, in order to provide for support and centering of the rotor. Torque is applied by the turbine through shafting coupled to the central region of the torsion disc, and is transmitted from the flange to the aforementioned annuli and rim. Such torque-transmission is borne by suitable plates which are oriented transversely of the spider radius and link the flange to the various annuli. Preferably, the necessary transverse plates are provided merely by bending any portions of said rim-supporting webs which are linked by the flange, although a continuous collar of plates may be employed in linking some of the annuli to the flange. Such bent portions of the web are curved forward in the direction of rotation whereby, besides serving as plates to transmit torque between the various annuli, they are also effective as the volute vanes of a centrifugal impeller or fan for which the spider bore forms an access "well." Thus the whole rotor becomes a gigantic centrifugal fan inflicting a radial blower action through the rotor rim lamination vents onto the series of field-poles, which are conventionally carried by its periphery and thus become subjected to intensive ventilation.

To derive a more adequate understanding of the aims and operation of my invention, reference should be made to the succeeding description with its associated drawings in which:

FIG. 1 is a sectional schematic view of a rotor of the overhung type embodying the principles of my invention and incorporated in a waterwheel generator arranged for overhead ventilation.

FIG. 2 is a partially sectioned perspective view of the rotor of FIG. 1 showing certain essential details of my invention.

Figure 3:
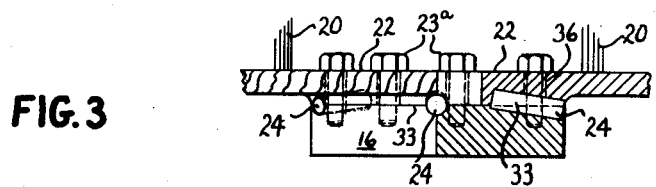
FIG. 3 is a sectional schematic view illustrating the means by which a driveshaft is coupled to a rotor spider-hub in accordance with my invention.

Referring now to the drawings wherein like reference characters designate like or corresponding parts throughout the several views, there is shown in FIGURE 1 a hydroelectric generator of the vertical type comprising a stator 1 supported over an hydraulic turbine runner pit 2 having masonry walls 3. Stator 1 consists essentially of a plurality of magnetizable laminations 4 stacked in a retaining frame 5 and carrying electrical windings 6. Frame 5 may comprise arcuate members 7 joined together by vertical ribs 8 and keys 8a to provide a cellular structure capable of supporting the magnetizable core formed by stator laminations 4. The construction used for supporting a rotor 9 inside the stator core comprises a framework 10 of radially arrayed girders retained in the runner pit 2 as by attachment to the concrete walls 3 thereof. Foundation slabs 11 may be provided in walls 3 for such attachment.

The stationary girder-framework 10 supports an annular segmental-shoe type thrust-bearing 12, which is immersed in an oil reservoir 13 having substantially cylindrical oil-retaining outer and inner walls 14 and 15 respectively. A torsion disc 16 is seated on bearing 12 and is preferably fastened to a driveshaft 17 by bolts 23 as shown, although it may be an integrally forged part of the upper flange 18 on driveshaft 17 if desired. Driveshaft 17 may preferably comprise the shaft of a hydraulic turbine (not shown), or may be a jackshaft provided with a lower flange 18a for coupling thereto as in contemporary designs. The necessary centering of rotor 9 and its driveshaft 17 is achieved by a guide-bearing 19, cooperating with a journal surface on the periphery of torsion plate 16 as shown.

Rotor 9 comprises a spider structure including a series of arms 20 forming a spider or web structure radiating between coextensive and substantially parallel annuli 21 from a central bore region 32. Only a pair of such annuli 21 have been shown flanking the angularly distributed arms 20 to act as baffles defining respective upper and lower faces 42 and 43 of the rotor 9, although it will be appreciated that more annuli, such as the annuli 21, may be provided intermediate those shown, if desired. Bore 32 thus forms an access well extending centrally into the rotor spider between the reinforced inner edges of all the annuli 21.

Rotor laminations 4a are customarily clamped together in tiers 4b as by bolts 23b, and the tiers then are shrunk-fit about the outer extremities 25 of spider arms 20 as on tapered keys (not shown). The tiered laminations 4b carry a number of field poles 26 which are fixed in dovetailed slots 27 (FIG. 2). Bolts 23a fasten rotor to torsion disc 16 via an inwardly projecting flange 22, which is suitably formed on one of the annuli 21. The manner of achieving this coupling of torsion disc 16 and flange 22 is shown in greater detail in FIG. 3, wherein a quadrantal segment of the spider has been omitted from the right-hand portion of the drawing in order to clarify the hub fastening arrangement. Accordingly, by drilling holes for radially disposed dowels 24 prior to any dismantling operation for shipping purposes, the ready centering of rotor 9 with respect to torsion disc 16 is ensured upon subsequent reassembly at the installation site. By providing a liberal tolerance for bolts 23a adapted to extend through holes 36 in flange 22, it is possible, by suitably adjusting the bolt tensions, to also ensure that the torsional stress transmitted from driveshaft 17 will be assumed by the interface friction at 33 between the upper peripheral surface of disk 16 and flange 22 in conjunction with the radial centering dowels 24. Obviously other constructions may be employed for connecting the rotor spider to the driveshaft, although the preferred construction is that illustrated since it facilitates rapid assembly and dismantling, and prevents the fastening bolts 23a from binding into either flange 22 or torsion disc 16 or both.

An exciter 28 is used for supplying D.-C. exciting current to the windings of field poles 26 and is coupled to torsion disc 16 through a lightweight hollow fabricated structure 30 extending into the central well formed by bore 32 of the rotor 9. This exciter rotor coupling structure 30 preferably assumes the form of a pyramidal, conical, or similar frustum exhibiting torsional and lateral stiffness, although alternatively, conventional solid shafting may be used. Stator 29 of exciter 28 is supported above rotor 9 by any convenient means such as the framework of access-hatch 31. A brake surface 34 is provided on the lower face of the rotor 9 for cooperation with any suitable brake means 35 to enable rapid stopping of the rotor.

FIG. 2 illustrates the rotor of a waterwheel type hydroelectric generator incorporating my improved ventilation system. It will be evident that in contemporary rotor constructions employing a throughgoing driveshaft, it is a relatively simple matter to effect torque transmission therefrom to both faces of the rotor spider. For instance, the cylindrical hubs of the prior art may be provided with a pair of "bobbin" type coupling flanges as in my aforementioned Canadian Patent 455,303. However, with the rotor spider bore construction providing a central access well 32 as contemplated by the instant application, it is desirable to ensure torque-transmission from driveshaft 17 and flange 22, not only to whatever annulus forms the face 43 adjacent the bearing, but also to any other annuli remote from the bearing, such as that comprising upper face 42 of the spider. My invention achieves transmission of torque to both flanking annuli 21 simply by curving the portions 37 of arms 20, thus, making the arms 20 rigid so when they are linked together by flange 22, as shown in FIG. 2, they effectively transmit torque between the annuli 21. Preferably, the portions 37 are curved in the same direction as rotor 9 is rotated, as shown by arrow 38 so as to assist in the outward acceleration of ventilating air. The remaining portion 39 of arms 20 may remain disposed substantially radially of the rotor as shown, or in any manner which best resists the mechanical forces present.

The necessary torque-transmission from inwardly projecting flange 22 and its associated annuli 21 to the other annuli 21, such as the upper face 42 of the spider, is thus achieved through the curved portions 37 whereby all annuli 21 are able to apply a fraction of the driving torque to rotor 9. These curved portions 37 are mechanically equivalent to a continuous collar insofar as torque-transmission is concerned. This arrangement of arms 20 eliminates the central congestion of rotor 9 that would arise from a throughgoing shaft or a continuous torque-transmitting collar and not only provides ventilating entry ports 40 for volute ducts 41, into which the rotor spider is partitioned by rim-support arms 20 and annuli 21, but also results in enhanced rigidity to torsional and other stresses. Such torsional stresses are continuously imposed on arms 20 due to the turbine imparting torque to the driveshaft 17 while the rotor 9 is under electrolynamic load. Such stresses tend to cause slight angular displacements, or torsional strains, between the respective upper and lower faces 42 and 43 of the rotor 9. Curved spider arms 20 readily resist such torsions, even if made thinner than the straight radially-extending arms formerly employed. Upper annuli face 42 has been illustrated as cutaway along a line 44 in FIG. 2 to enable a better view of volute ducts 41 and volute arms 20, the entrant ends 45 of which extend between the inner surfaces of annuli 21 to define the aforementioned bolt-access well 32.

The rotor lamination stacks 4b are preferably constructed in accordance with my Canadian Patent 418,847, whereby a number of venting passages 47 are provided, shown in FIG. 1 as extending radially through the tiered laminations 4a and leading to the interpolar spaces 48 (FIG. 2). In operation, therefore, ventilating air flows into entry ports 40 from access well 32 and is impelled radially outwardly along volute ducts 41, due to the centrifugal head acquired by rotation of the air within the ducts 41 and the blower action provided by volute arms 20.

The air then exhausts through stacked rotor laminations 4a via the circumferential vent passages 47, substantially as shown in the afore-mentioned Canadian Patent 418,847, and is expelled as at 49 between field poles 26. Some of the poles have been omitted from their keyways 27 in FIG. 2 to better illustrate this exit of air (arrows 49a) from the outer faces of rotor venting passages 47. Thereafter, the air is constrained to discharge through cooperating vents 47a, FIG. 1, which may be similarly formed in the stator core laminations 4. The necessary constraining action is exercised by axial-fan blades 50 attached to segmental annular cowls 46 and arranged opposite the interpolar spaces 48 such as to exert an obturating aerodynamic reaction illustrated by arrows 51a against any tendency for the ventilating air to escape axially along the rotor 9 and thus re-enter the rotor without passing through the stator 1 and coolers (not shown). Blades 50, FIG. 2, preferably comprise arcuate metal sheets with their edges turned towards their concave surfaces, whereby the centrifugal afflux of air therealong is deflected away from any tendency to leak past the blade edges and thence from the air gap of the machine. It will be noted that blades 50 are situated such that they do not interfere with removal of the rotor, since they require no cooperating shroud on the stator as in some contemporary systems.

The general trend of air circulation illustrated by arrows 51 (FIG. 1) is from above the upper face 42 of the rotor annuli 21 into bolt-access well 32 and thence via volute ducts 41 through the rotor and stator lamination vents 47, 47a respectively and into air coolers (not shown) for return to the rotor 9 over the end windings under access hatch 31. This general airflow trend is supplemented by the minor flow occurring at 51a (FIG. 2) into the ends of the interpolar gaps 48, due to a slight prearranged "over-reaction" by obturation blades 50 to ensure a net pressurization axially inwards. As large waterwheel generators are essentially low-speed machines, the small increase in windage incurred by such a blower construction will be more than compensated for by the higher rating allowable in view of the improved ventilation available.

As a coolant return passageway is readily available under the generator access hatches 31, it is unnecessary to replenish the air supply from outside the cooling system, and the ventilation circuit is thus entirely integral with the machine. Since the cooling airflow is thus mostly from overhead, the construction has the virtue of not requiring ventilating ducts from the air coolers (not shown) down to pit 2 as with updraft ventilation systems, whereby the substructure walls 3 are of simplified construction and allow much closer turbine-generator coupling. In fact, the construction even permits supporting the rotor loads on the turbine headcover, the only turbine-generator clearance necessary being that essential to servicing of the turbine. My invention thus results in substantial economies in the power-house structure and also in the amount of forged shafting required, since the conventional exciter-coupling shaft is replaced by the hollow structure 30 and the drive shaft 17 may be the turbine shaft itself.

As shown in FIG. 1, the principal characteristic of an overhung rotor construction is that the poles 26 extend substantially below the plane of the rotor arms 20 in order that the resultant of any electromagnetic or mechanical unbalancing forces thereon will act below the thrust bearing 12 and so give rise to a dynamically stable mode of operation. Thus the essential feature of the overhung construction is to bring the rotor 9 and thrust bearing 12 closer together on the shaft axis and thereby reduce the overturning moment of the rotor about the supporting thrust bearing. My invention not only achieves this desired close coupling at 33 (FIG. 3) between rotor 9 and torsion disc 16, but also allows considerable radial extension of the thrust bearing surface to provide a more stable base against the overturning moment.

This relatively large diameter of the thrust bearing 12 is permitted by employing the torsion disc 16, which may readily be flame-cut from a slab of plate steel and is thus physically unrestricted by forging consideration. The various components of thrust bearing 12 and guide bearing 19 are arranged to be removable through outer wall 14 of the oil reservoir 13 for servicing, thus also permitting close coupling of the generator and turbine and providing an axially-compact generator which runs stably even when decoupled from driveshaft 17 for operation as a synchronous condenser.

Figure 4:
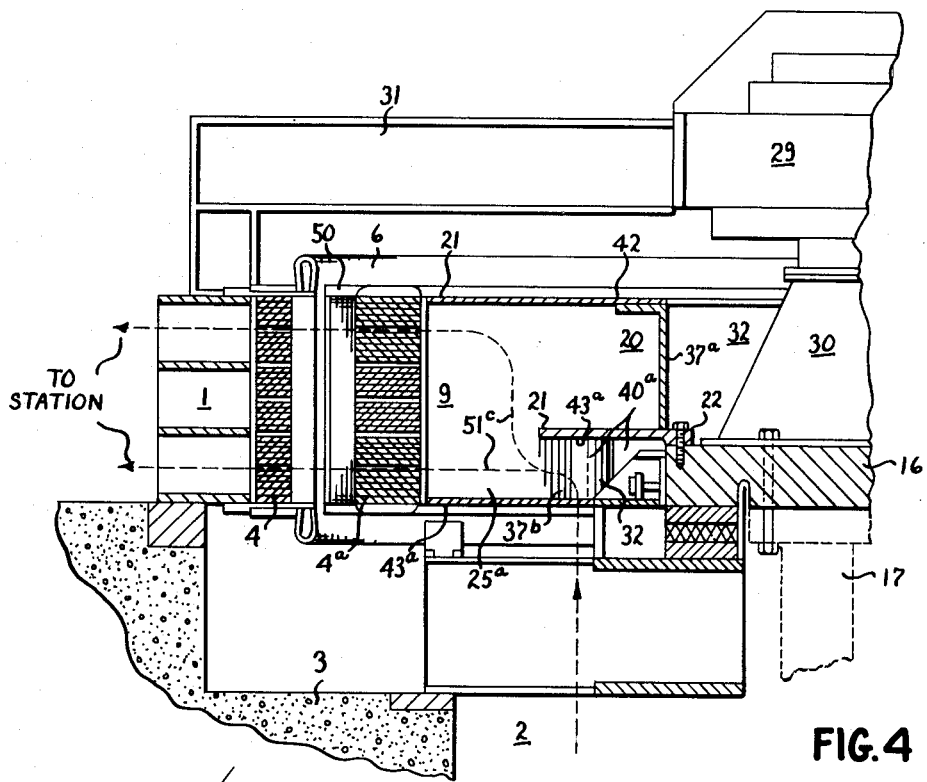
FIG. 4 is a sectional schematic view of a rotor of the overhung type embodying the principles of my invention in modified form suitable for incorporation in a waterwheel generator arranged for updraft ventilation.
Figure 5:
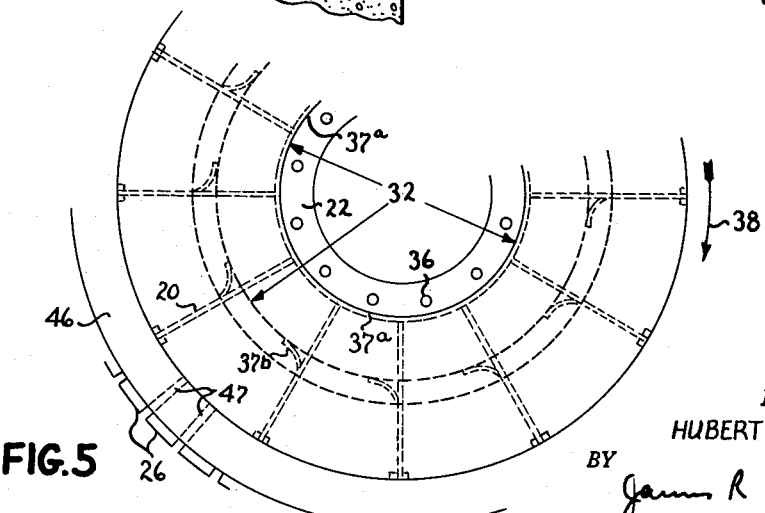
FIG. 5 is a partial plan view of the modified rotor of FIG. 4 showing in essential detail how my invention is applied thereto.

A minor modification of my design producing a welcome increase in the ventilation available to exciter 28 resides in providing a simple enclosure 53 thereover having suitable admission ports 54. Ports 54 allow exciter 28 to draw on the main trend of air circulation 51 as shown by arrows 51b. Moreover, since this subsidiary trend of flow 51b consists of cooled air being recirculated, there is little dust introduced to the exciter by such a system. Alternatively, the necessary exciter ventilation ports may be provided externally as at 54a. Although my invention displays the most beneficial results when employing the closed-circuit ventilation system of FIGS. 1 and 2, it may nevertheless readily be adapted to have air supplied through ducts to the top of the rotor 9 for exhaustion from the stator 1 into the generating station for heating same in winter. Alternatively, an open-circuit ventilation system may be resorted to whereby rotor cooling air is supplied from the station as through ports 54a and exhausted outdoors through ducts, or else the air may enter and leave the generator through ducts leading outdoors.

Where it is necessary to install an overhung generator in a station designed for updraft ventilation, whereby air enters the turbine pit 2 and exhausts via rotor 9 and stator 1 into the station, my invention may be readily adapted thereto by the simple artifice revealed in FIGS. 4 and 5. Since a pit-ventilated generator is required in such a station, the overhead entry ports 40 are not now required and the volute curved portions 37 may be replaced by an equivalent continuous collar formed by similar plates 37a transversely attached to supporting arms 20 about access well 32, such as to perform the necessary torque-transmission function between the inwardly projecting flange 22 and the annulus at the uppermost face 42 of the rotor 9. The air impelling function of entry ports 37 is now assumed in FIGS. 4 and 5 by similar volute vanes 37b disposed on the underside of the rotor 9 to provide the desired updraft. Such volute vanes 37b are readily provided as by extending spider arms 20 downwardly at their lower extremities 25a as in FIG. 4, and curving the extended portions as in the top view of FIG. 5, to provide the volute vanes 37b. The necessary entry ports 40a are provided (FIG. 4) by removing collar portions 52 (FIG. 1) of the lower face 43 of the annulus 21. The trend of circulation of cooling air is then essentially radial as before and is indicated in FIG. 4 at 51c. As in all aforementioned embodiments of my invention, the requisite torque-transmission from the torsion-disc-coupling projecting flange 22 to the volute-supported annulus (in this instance lower face 43a of FIG. 4) is achieved by the curvature of the volute vanes 37b themselves. Such a volute configuration of downward web-extension 25a is able to provide quite appreciable ventilation, even when on the bearing-adjacent face 43a of the rotor 9 as shown in FIG. 4. In some designs, volute entry vanes 37b may of course be provided in the upper face 42 of the rotor 9, or on both faces 42 and 43a, instead of on the lower face 43a only as in FIG. 4. Furthermore, any number of the annuli 21 may be provided between the pair of annular flanking baffles comprising rotor faces 42 and 43, and the continuous collar formed by transverse plates 37a may be of any configuration suitable for torque-transmission, such as cylindrical (as shown) or polygonal.

It is of course contemplated that my invention will be applicable also to the straight, horizontally extending type of spider in which the poles are not overhung but are symmetrically disposed with respect to the plane of the rotor spider. It would also be possible to use my improved rotor ventilation principles in a waterwheel generator employing an overhead thrust bearing and ventilated from the underside of the rotor. This could be done by similarly providing suitable openings in the annulus forming the lowermost face 43 of the spider for entry of air to entry ports 40a as in FIG. 4.

The discrete plate-steel torsion disc 16 used to effect intercoupling between the spider, the driveshaft 17 and the hollow shaft structure 30 has been proven to furnish a feasible bearing surface and such use of plate-steel to form a discrete torsion disc 16 eliminates the expensive forging formerly considered necessary and either shrunk-fit or integrally forged on the driveshaft upper flange 18 (FIG. 1). A special driveshaft 17 is thus no longer required and a length of a standard type of driveshaft 17 may be used instead. Since the thrust bearing 12 is not now constrained to a location under upper flange 18, the lower flange 18a may be drawn completely through the assembled bearing 12 while still connected to a rotor 9 which is being removed for servicing. Since the dimensions of a plate-steel torsion disc are unaffected by considerations of available forging capacities, the cost of such a torsion disc is considerably reduced. The increased diameter thus possible with the plate-steel torsion disc 16 also allows fastening bolts 23, 23a and bearing 12 to be dispersed over a considerably greater fraction of the spider radius than with former constructions, whereby the bending moments are reduced and the space available for access to fastenings and air entry ports is increased, thereby permitting the use of simple clearance-type fastenings.

It will be appreciated from the foregoing that my invention is applicable to a variety of different rotor configurations normally employed in waterwheel generators, in addition to the specific type of rotor referred to for descriptive purposes in the specification. Indeed, my invention need not necessarily be confined solely to waterwheel generators but may be applied to other types of dynamoelectric machines should such use appear advantageous.

The attached drawings and descriptions have been directed specifically to a preferred embodiment and although my invention is particularly advantageous when applied to waterwheel generator rotors of the overhung type, it is to be understood that it is also applicable to other commonly used vertical-shaft machine configurations.

It likewise will be apparent that the invention may be used to advantage with rotors which dispense with the central well in the spider-bore and the invention may indeed be used in a variety of ways in low-speed machines other than waterwheel generators.

It is therefore to be understood that within the scope of the appended claims, the invention may be practiced otherwise than as specifically described.

What I claim as new and desire to secure by Letters Patent of the United States is:

1. A vertical dynamoelectric machine rotor comprising a centrifugally-ventilated pole-carrying rim, a plurality of field poles, a plurality of arms angularly distributed about a substantial central access-region for support of said rim, a pair of annuli flanking said arms between said central region and said rim to form an integral rotor spider-structure, portions of said arms adjacent said central region being curved toward the direction of rotor rotation to form torque-transmitting baffles, essentially annular flange means connected to one of said pair of annuli and projecting into said central region from between said baffles whereby torque may be applied thereto to rotate said rim via said annuli, a torsion-disc located in said central region for coupling said flange to shafting means comprising at least a driveshaft disposed below the rotor, said torsion-disc having an upper peripheral surface detachably affixed to said flange and a lower peripheral surface supported directly on a thrust-bearing through which said driveshaft extends, said torsion-disc also having a circumferential surface journalled in a guide-bearing to effect centering of the entire rotor, said arms and annuli thus effectively partitioning said rotor spider-structure to form a plurality of volute ducts into which air is impelled centrifugally from said central region during rotation of the rotor, said curved torque-transmitting arms being also effective as baffles facilitating the centrifugal trend of ventilation through said volute ducts from said central region towards said rim, and obturation means adjacent the ends of said poles to seal the air gaps between said poles against any substantial axial escape of air therebetween, whereby the efflux of air through the rotor rim is constrained to continue radially outwardly through stacks of stator laminations of said dynamoelectric machine disposed adjacent said rotor rim.

2. A vertical dynamoelectric machine rotor as in claim 1, wherein said annular flange comprises an integral extension of the lowermost flanking-annulus, whereby said rotor is essentially adapted for overhead ventilation.

3. A vertical dynamoelectric machine rotor comprising a centrifugally-ventilated pole-carrying rim, a plurality of field poles, a plurality of arms angularly distributed about a substantial central access-region for support of said rim, portions of said arms adjacent said central region curved toward the direction of rotor rotation to form curved baffles, plates joining adjacent arms essentially tangential to said central region, a pair of annuli attached to said arms and rim to form an integral spider-structure, said annuli flanking said arms between said central region and said rim to enable torque transmission from both the curved arms and the tangential plates to the rim, an essentially annular flange disposed intermediate said annuli and projecting into said central region from between said arms, said flange applying torque to the uppermost annulus via said tangential plates and to the lowermost annulus via said curved baffles, a torsion-disc located in said central region for coupling said flange to a suitable driveshaft disposed below the rotor, said torsion-disc having an upper peripheral surface affixed to said flange and a lower peripheral surface supported directly on a thrust-bearing through which said driveshaft extends, said torsion-disc also having a circumferential surface journalled in a guide-bearing to effect centering of the entire rotor, said arms and annuli thus effectively partitioning said rotor spider structure into a plurality of ducts having volute entry portions below said flange, said curved baffles forming volute entrances to said ducts and being effective to impel air centrifugally into said ducts from that portion of said central region which is beneath said torsion disc and essentially concentric with said thrust-bearing, said volute entrances facilitating the centrifugal trend of ventilation from the central region of said rotor towards said rim, and obturation means adjacent the ends of said poles to seal the air gaps between said poles against any substantial axial escape of air therebetween whereby the efflux of air through the rotor rim is constrained to continue radially outwardly through stacks of stator laminations of said dynamoelectric machine disposed adjacent said rotor rim.

4. A vertical dynamoelectric machine rotor as in claim 1 wherein said shafting means comprises respectively a solid shaft for coupling the lower face of said torsion-disk to a driving turbine, a lightweight shafting structure for rigidly coupling the upper face of said torsion-disk to a D.-C. exciter employed to energize said poles, a portion of the air being drawn down into said central access-region due to rotation of said rotor being directed through said exciter, in order to effect substantial ventilation thereof prior to exhaustion of the air through said ducts within the rotor spider.

5. A vertical dynamoelectric machine rotor as defined in claim 3, wherein said essentially tangential plates comprise a continuous cylindrical collar forming a bolt-access well above said torsion-disc.

6. A vertical dynamoelectric machine rotor as in claim 1, wherein said torsion-disk and said flange are each provided with a plurality of cooperating depressions, and a plurality of dowels are disposed respectively in each of said cooperating depressions to insure correct realignment of said intercoupled flange and torsion-disc during reassembly operations.

7. A dynamoelectric machine comprising an annular rotor, means defining a plurality of apertures in said rotor at angularly spaced points thereon forming radial air ducts through said rotor, a plurality of arms mounted on said rotor and extending radially inward therefrom, said arms having inner ends terminating respectively a substantial distance from the center of said rotor, a pair of annuli mounted respectively on the opposing lateral edges of said arms thereby to form with said arms a plurality of air ducts cooperating with the air ducts through said rotor and extending radially inward from said rotor to a central region thereof, said arms being curved intermediate their respective inner ends and their respective outer ends thereby to form rigid baffles for supporting said annuli in fixed relationship, the radial width of one of said annuli being substantially equal to the length of said arms whereby the inner edge of said one of said annuli and the inner ends of said arms form an access well at the central portion of said rotor, and means for effecting rotation of said rotor.

8. A dynamoelectric machine comprising an annular rotor, means defining a plurality of apertures in said rotor at angularly spaced points thereon forming radial air ducts through said rotor, a plurality of arms mounted on said rotor and extending radially inward therefrom, said arms having inner ends terminating respectively a substantial distance from the center of said rotor, a pair of annuli mounted respectively on the opposing lateral edges of said arms thereby to form with said arms a plurality of air ducts cooperating with the air ducts through said rotor and extending radially inward from said rotor to a central region thereof, said arms being curved intermediate their respective inner ends and their respective outer ends thereby to form rigid baffles for supporting said annuli in fixed relationship, the radial width of one of said annuli being substantially equal to the length of said arms whereby the inner edge of said one of said annuli and the inner ends of said arms form an access well at the central portion of said rotor, the radial width of the other of said annuli including a flange portion projecting into said access well, a torsion-disk drivingly connected to said flange portion, a thrust-bearing disposed to engage said torsion-disk thereby supporting the rotor for rotation, and drive means connected to said torsion-disk for effecting rotation of said rotor.

9. A dynamoelectric machine as defined in claim 8 wherein said torsion-disk and said flange are each provided with at least one cooperating depression, and a dowel disposed in each of said cooperating depressions to align said torsion-disk and said flange.

10. A dynamoelectric machine as defined in claim 8 wherein said torsion-disk is journaled in a guide-bearing thereby affording means for centering said rotor.

11. A dynamoelectric machine as defined in claim 8 wherein said torsion-disk is disposed to serve as a thrust-bearing surface, said torsion-disk having sufficient width to support said rotor in a dynamically stable position.

12. A dynamoelectric machine as defined in claim 8 wherein said drive means comprises a driveshaft connected to one surface of said torsion-disk, and a hollow shafting structure is disposed in said access well and connected to the other surface of said torsion-disk for rotation therewith thereby to afford means for rigidly coupling said other surface to said rotor exciting means.

13. A dynamoelectric machine comprising an annular rotor, means defining a plurality of apertures in said rotor at angularly spaced points thereon forming radial air ducts through said rotor, a plurality of arms mounted on said rotor and extending radially inward therefrom, said arms having inner ends terminating respectively a substantial distance from the center of said rotor, a pair of annuli mounted respectively on the opposing lateral edges of said arms thereby to form with said arms a plurality of air ducts cooperating with the air ducts through said rotor and extending radially inward from said rotor to a central region thereof, the radial width of said annuli being substantially equal to the length of said arms whereby the inner edges of said annuli and the inner ends of said arms form an access wall at the central portion of said rotor, a third annulus disposed intermediate said pair of annuli and fastened to each of said arms, said third annulus including a flange portion projecting into said access well, a plurality of volute vanes disposed between one of said pair of annuli and said third annulus thereby forming ducts between the access well and said plurality of ducts cooperating with the air ducts through said rotor, a plurality of plates disposed between the third annulus and the other of said pair of annuli and transversely attached to the ends of said arms to form a collar for rigidly supporting said other of said pair of annuli in fixed relationship with said third annulus, and means for effecting rotation of said rotor.

14. A dynamoelectric machine as defined in claim 13 wherein said volute vanes comprise integral curved portions of the respective inner ends of said arms.

15. A dynamoelectric machine as defined in claim 13 wherein said volute vanes have inner ends that are curved forwardly in the direction of normal forward rotation of said rotor thereby to form a plurality of rigid vanes that serve as air entry ports to centrifugally accelerate air along said ducts and thence through the air ducts in the rotor.

16. A dynamoelectric machine as defined in claim 13 wherein the means for effecting rotation of the rotor comprises a torsion-disk drivingly connected to said flange portion of said third annulus, a driveshaft drivingly connected to said torsion-disk, a thrust-bearing engaging said torsion-disk and supporting it for rotation, and drive means connected to said driveshaft for effecting rotation of said rotor.

17. A dynamoelectric machine as defined in claim 16 wherein said thrust-bearing surrounds said drive shaft and is provided with a bore therethrough having adequate radial clearance relative to said drive shaft to allow removal of the rotor and drive shaft in their assembled form without prior dismantling of said thrust-bearing.

18. A dynamoelectric machine comprising an annular rotor, means defining a plurality of apertures in said rotor at angularly spaced points thereon forming radial air ducts through said rotor, a plurality of arms mounted on said rotor and extending radially inward therefrom, said arms having inner ends terminating respectively a a substantial distance from the center of said rotor, a pair of annuli mounted respectively on the opposing lateral edges of said arms thereby to form with said arms a plurality of air ducts cooperating with the air ducts through said rotor and extending radially inward from said rotor to a central region thereof, a plurality of plates disposed between said annuli and transversely attached to the ends of said arms to rigidly support said annuli in fixed relation, the radial width of one of said annuli being substantially equal to the length of said arms whereby the inner edge of said one of said annuli and the inner ends of said arms from a spacious access well at the central portion of said rotor, and means for effecting rotation of said rotor.

19. A dynamoelectric machine as defined in claim 18 wherein said plates have their respective inner ends sloped forwardly in the direction of normal forward rotation of said rotor thereby to form a plurality of air entry ports to centrifugally accelerate air along said ducts and thence through the air ducts in the rotor.

20. A dynamoelectric machine comprising an annular rotor disposed to rotate in a substantially horizontal plane, a plurality of field poles mounted at angularly spaced points on said rotor, a plurality of apertures in said rotor at angularly spaced points thereon forming radial air ducts through said rotor, a plurality of arms mounted on said rotor and extending radially inward therefrom, said arms having inner ends terminating respectively a substantial distance from the center of said rotor, a pair of annuli mounted respectively on the opposing lateral edges of said arms thereby to form with said arms a plurality of air ducts cooperating with the air ducts through said rotor and extending radially inward from said rotor to a central region thereof, said arms being curved intermediate their respective inner ends and their respective outer ends thereby to form rigid baffles for supporting said annuli in fixed relationship, the radial width of one of said annuli being substantially equal to the length of said arms whereby the inner edge of said one of said annuli and the inner ends of said arms form a spacious access well at the central portion of said rotor, a pair of obturating fan blades attached respectively to the upper and lower ends of each of said field poles thereby to maintain a centrifugal trend of air flow and to prevent air flowing through the radial rotor ducts from directly re-entering the central portion of said rotor, and means for effecting rotation of said rotor.

References Cited in the file of this patent

UNITED STATES PATENTS

| | | |
|---|---|---|
| 2,615,938 | Gynt | Oct. 28, 1952 |

FOREIGN PATENTS

| | | |
|---|---|---|
| 174,109 | Austria | Feb. 25, 1953 |
| 741,240 | Germany | Nov. 8, 1943 |
| 1,129,292 | France | Sept. 3, 1956 |

UNITED STATES PATENT OFFICE

CERTIFICATE OF CORRECTION

Patent No. 2,994,793            August 1, 1961

Hubert R. Sills

It is hereby certified that error appears in the above numbered patent requiring correction and that the said Letters Patent should read as corrected below.

Column 9, line 26, before "curved" insert -- being --; column 12, line 11, for "from" read -- form --.

Signed and sealed this 3rd day of April 1962.

(SEAL)
Attest:

ERNEST W. SWIDER
Attesting Officer

DAVID L. LADD
Commissioner of Patents